(12) United States Patent
Evancha et al.

(10) Patent No.: US 11,338,190 B2
(45) Date of Patent: May 24, 2022

(54) USER INTERFACE WITH SEGMENTED TIMELINE

(71) Applicant: Peloton Interactive, Inc., New York, NY (US)

(72) Inventors: Betina Evancha, Brooklyn, NY (US); John Foley, New York, NY (US); Joseph Intonato, Brooklyn, NY (US); Jackson Maslow, Brooklyn, NY (US); Benoit Dion, New York, NY (US); Thomas Cortese, Brooklyn, NY (US)

(73) Assignee: Peloton Interactive, Inc., New York, NY (US)

( * ) Notice: Subject to any disclaimer, the term of this patent is extended or adjusted under 35 U.S.C. 154(b) by 0 days.

(21) Appl. No.: 16/188,172

(22) Filed: Nov. 12, 2018

(65) Prior Publication Data
US 2019/0143194 A1    May 16, 2019

Related U.S. Application Data

(60) Provisional application No. 62/584,887, filed on Nov. 12, 2017.

(51) Int. Cl.
*A63B 71/06* (2006.01)
*A63B 24/00* (2006.01)
(Continued)

(52) U.S. Cl.
CPC ...... *A63B 71/0622* (2013.01); *A63B 22/0605* (2013.01); *A63B 24/0062* (2013.01);
(Continued)

(58) Field of Classification Search
CPC ............ A63B 71/0622; A63B 24/0062; A63B 24/0075; A63B 24/0084; A63B 22/0605;
(Continued)

(56) References Cited

U.S. PATENT DOCUMENTS 3,976,192 A    8/1976 Muller
4,614,337 A    9/1986 Schonenberger
(Continued)

FOREIGN PATENT DOCUMENTS

EP    0919259       6/1999
WO    WO199741925   11/1997
WO    WO2005087323  9/2005

OTHER PUBLICATIONS

The PCT Search Report and Written Opinion dated Dec. 13, 2017, for PCT Application No. PCT/US2017/48650, 14 pages.
(Continued)

*Primary Examiner* — Nyca T Nguyen
(74) *Attorney, Agent, or Firm* — Haynes and Boone, LLP

(57) ABSTRACT

A method includes receiving a video input, receiving an indication of a first segment type corresponding to a first workout activity being performed in the video input, and generating a segmented timeline with the processor, the segmented timeline including a plurality of segments, and at least one segment of the plurality of segments corresponding to the first workout activity. The method further includes generating a user interface with the processor, the user interface including the segmented timeline displayed together with at least part of the video input. The method also includes providing the user interface to a plurality of exercise machines via a network.

20 Claims, 8 Drawing Sheets

(51) Int. Cl.
*A63B 22/06* (2006.01)
*H04N 5/445* (2011.01)
*H04N 21/4415* (2011.01)
*H04N 21/214* (2011.01)
*G09B 9/00* (2006.01)
*H04L 67/12* (2022.01)

(52) U.S. Cl.
CPC ...... *A63B 24/0075* (2013.01); *A63B 24/0084* (2013.01); *G09B 9/00* (2013.01); *H04N 5/44504* (2013.01); *H04N 21/2143* (2013.01); *H04N 21/4415* (2013.01); *A63B 2022/0658* (2013.01); *A63B 2024/0081* (2013.01); *A63B 2071/0647* (2013.01); *A63B 2220/20* (2013.01); *A63B 2220/30* (2013.01); *A63B 2225/20* (2013.01); *A63B 2225/50* (2013.01); *A63B 2230/06* (2013.01); *A63B 2230/42* (2013.01); *H04L 67/12* (2013.01)

(58) Field of Classification Search
CPC .... A63B 2022/0658; A63B 2071/0647; A63B 2220/30; A63B 2230/06; A63B 2220/20; A63B 2230/42; A63B 2024/0081; A63B 2225/50; A63B 2225/20; A63B 24/0087; H04N 21/4415; H04N 21/2143; H04N 5/44504; G09B 9/00; G09B 19/0038; H04L 67/12
See application file for complete search history.

(56) References Cited

U.S. PATENT DOCUMENTS

| | | |
|---|---|---|
| 5,178,594 A | 1/1993 | Wu |
| 5,336,145 A | 8/1994 | Keiser |
| 5,441,468 A | 8/1995 | Deckers et al. |
| 5,458,548 A | 10/1995 | Crossing et al. |
| 5,547,439 A | 8/1996 | Rawls et al. |
| 5,656,000 A | 8/1997 | Russell |
| 5,947,868 A | 9/1999 | Dugan |
| 5,984,838 A | 11/1999 | Wang et al. |
| 5,989,161 A | 11/1999 | Wang et al. |
| 6,042,514 A | 3/2000 | Abelbeck |
| 6,050,924 A | 4/2000 | Shea |
| 6,171,218 B1 | 1/2001 | Shea |
| 6,231,482 B1 | 5/2001 | Thompson |
| 6,409,633 B1 | 6/2002 | Abelbeck |
| 6,601,016 B1 | 7/2003 | Brown et al. |
| 6,648,798 B2 | 11/2003 | Yoo |
| 6,702,719 B1 | 3/2004 | Brown et al. |
| 6,749,536 B1* | 6/2004 | Cuskaden .......... A63B 71/0622 482/1 |
| 6,764,430 B1 | 7/2004 | Fencel |
| 6,830,541 B2 | 12/2004 | Wu |
| 6,899,659 B2 | 5/2005 | Anderson et al. |
| 6,902,513 B1 | 6/2005 | McClure |
| 6,921,351 B1* | 7/2005 | Hickman ........... G06F 19/3481 482/8 |
| 6,997,853 B1 | 2/2006 | Cuskaden et al. |
| 7,153,241 B2 | 12/2006 | Wang |
| 7,166,062 B1* | 1/2007 | Watterson .......... A63B 24/0084 482/1 |
| 7,252,624 B2 | 8/2007 | Wu et al. |
| 7,455,620 B2 | 11/2008 | Frykman et al. |
| 7,562,761 B2 | 7/2009 | Tasma et al. |
| 7,594,878 B1 | 9/2009 | Joannou |
| 7,618,352 B1 | 11/2009 | Wei |
| 7,628,730 B1* | 12/2009 | Watterson ............ A63B 21/005 482/8 |
| 7,678,023 B1* | 3/2010 | Shea ................. A63B 24/0075 482/1 |
| 8,012,067 B2 | 9/2011 | Joannou |
| 8,348,813 B2 | 1/2013 | Huang |
| 8,608,624 B2 | 12/2013 | Shabodyash et al. |
| 8,829,376 B2 | 9/2014 | Wei |
| 8,986,169 B2 | 3/2015 | Bayerlein et al. |
| 9,174,085 B2* | 11/2015 | Foley ..................... G16H 20/10 |
| 9,254,411 B1 | 2/2016 | Chang |
| 9,452,314 B2 | 9/2016 | Hou |
| 9,463,349 B1 | 10/2016 | Chang |
| 9,579,544 B2 | 2/2017 | Watterson |
| 9,616,278 B2 | 4/2017 | Olson |
| 9,636,567 B2 | 5/2017 | Brammer et al. |
| 9,649,528 B2 | 5/2017 | Hou |
| 9,675,839 B2 | 6/2017 | Dalebout et al. |
| 9,682,307 B2 | 6/2017 | Dalebout |
| 9,764,178 B1* | 9/2017 | Wein .................. A63B 21/0055 |
| 10,600,335 B1* | 3/2020 | Donovan .......... G09B 19/0053 |
| 2002/0016235 A1* | 2/2002 | Ashby ............... A63B 22/0242 482/8 |
| 2002/0091627 A9 | 7/2002 | Yang |
| 2005/0054490 A1 | 3/2005 | Chou |
| 2006/0183602 A1* | 8/2006 | Astilean ............. A63B 24/0062 482/7 |
| 2007/0072743 A1 | 3/2007 | Severino et al. |
| 2007/0073592 A1* | 3/2007 | Perry ................. G06Q 30/0603 705/26.1 |
| 2007/0265138 A1* | 11/2007 | Ashby .................... H04L 67/04 482/8 |
| 2007/0281831 A1 | 12/2007 | Wang |
| 2008/0161161 A1* | 7/2008 | Pipinich ............. A63B 69/0028 482/8 |
| 2010/0009810 A1* | 1/2010 | Trzecieski ......... A63B 71/0622 482/8 |
| 2010/0022354 A1* | 1/2010 | Fisher ................ A63B 24/0087 482/8 |
| 2010/0035726 A1* | 2/2010 | Fisher ................ A63B 22/0605 482/8 |
| 2010/0156625 A1* | 6/2010 | Ruha ..................... A61B 5/002 340/539.12 |
| 2010/0197460 A1* | 8/2010 | Czarnecki .......... A63B 22/0605 482/2 |
| 2010/0197461 A1* | 8/2010 | Czarnecki ............. G06Q 99/00 482/2 |
| 2011/0172060 A1* | 7/2011 | Morales ............... A63B 69/004 482/8 |
| 2011/0319229 A1* | 12/2011 | Corbalis ............ A63B 71/0622 482/9 |
| 2012/0088633 A1 | 4/2012 | Crafton |
| 2012/0108394 A1* | 5/2012 | Jones .................. A63B 69/004 482/8 |
| 2013/0041590 A1* | 2/2013 | Burich ............... G06Q 10/0639 702/19 |
| 2013/0281241 A1 | 10/2013 | Watterson et al. |
| 2014/0038781 A1* | 2/2014 | Foley .................. G06F 19/3481 482/9 |
| 2014/0082526 A1 | 3/2014 | Park et al. |
| 2014/0135173 A1* | 5/2014 | Watterson .......... A63B 22/0235 482/8 |
| 2015/0238817 A1* | 8/2015 | Watterson .......... G06F 19/3481 482/8 |
| 2015/0240507 A1* | 8/2015 | Kolodny ............ G06F 19/3481 52/234 |
| 2016/0023045 A1 | 1/2016 | Dalebout |
| 2016/0023049 A1 | 1/2016 | Dalebout |
| 2016/0103970 A1 | 4/2016 | Liu et al. |
| 2016/0166877 A1 | 6/2016 | Cei et al. |
| 2016/0199695 A1 | 7/2016 | Armstrong |
| 2016/0325145 A1* | 11/2016 | Pinkerton ............... G06F 16/60 |
| 2017/0326411 A1* | 11/2017 | Watterson .......... A63B 22/0207 |
| 2017/0340917 A1 | 11/2017 | Chang |
| 2018/0056132 A1 | 3/2018 | Foley et al. |
| 2018/0126248 A1 | 5/2018 | Dion et al. |
| 2018/0126249 A1 | 5/2018 | Consiglio et al. |

OTHER PUBLICATIONS

"CompuTrainer", Racermate, 2017, retrieved Nov. 30, 2018 from <<http://www.racermateinc.com/computrainer/>>, 1 page.

(56) References Cited

OTHER PUBLICATIONS

"Netathlon", WebRacing, 2014, retrieved Nov. 30, 2018 from <<http://webracinginc.com/products_netathlon.htm>>, 3 pages.

* cited by examiner

USER INTERFACE WITH SEGMENTED TIMELINE

CROSS-REFERENCE TO RELATED APPLICATION

This application is a nonprovisional of U.S. Provisional Application No. 62/584,887, filed Nov. 12, 2017, the entire disclosure of which is incorporated herein by reference.

FIELD OF THE INVENTION

This application relates generally to the field of exercise equipment and methods associated therewith. In particular, this application relates to an exercise system and method configured to provide streaming and on-demand exercise classes to one or more users.

BACKGROUND

Humans are competitive by nature, striving to improve their performance both as compared to their own prior efforts and as compared to others. Humans are also drawn to games and other diversions, such that even tasks that a person may find difficult or annoying can become appealing if different gaming elements are introduced. Existing home and gym-based exercise systems and methods frequently lack key features that allow participants to compete with each other, converse with each other, and that gamify exercise activities.

While some existing exercise equipment incorporates diversions such as video displays that present content or performance data to the user while they exercise, these systems lack the ability to truly engage the user in a competitive or gaming scenario that improves both the user's experience and performance. Such systems also lack the ability to facilitate real-time sharing of information, conversation, data, and/or other content between users, as well as between an instructor and one or more users.

To improve the experience and provide a more engaging environment, gyms offer exercise classes such as aerobics classes, yoga classes, or other classes in which an instructor leads participants in a variety of exercises. Such class-based experiences, however, are accessible only at specific times and locations. As a result, they are unavailable to many potential users, generally are very expensive, and often sell-out so that even users in a location convenient to the gym cannot reserve a class. Example embodiments of the present disclosure address these problems by providing user interfaces that facilitate live streaming of instructional content, streaming of archived instructional content, socially networked audio and video chat, networked performance metrics, competition capabilities, and a range of gamification features.

SUMMARY OF THE INVENTION

In an example embodiment of the present disclosure, a method includes receiving video input from one or more sources. In such examples, the video input may be received from one or more different sources, and may comprise video of an instructor performing various workout activities in a performance studio. The method may also include receiving an indication of a first segment type. The first segment type may characterize and/or otherwise correspond to the workout activity currently being performed by the instructor in the studio. At least partly in response to receiving such an indication, a processor of the present disclosure may generate a segmented timeline including a variety of different information corresponding to and/or indicative of the first segment type. In such examples, the processor may also receive a plurality of first sensor information. For example, such first sensor information may be associated with a particular user that is performing the first workout activity, at a location remote from the performance studio, but simultaneously with the instructor. Such first sensor information may also be associated with a plurality of additional users performing the first workout activity, at respective locations remote from the performance studio, and simultaneously with the instructor and the particular user described above. In such examples, the processor may determine one or more first activity scores based at least partly on the first sensor information associated with the particular user. The processor may also generate a first user interface. In such examples, the first user interface may include the video content of the instructor performing the various workout activities described above. Such a first user interface may also include an indication of total time remaining in the workout. Such a first user interface may further include the segmented timeline and the activity score of the particular user. In some examples, the first user interface may also include a leaderboard that includes, among other things, activity scores corresponding to respective users of the plurality of additional users currently participating in the workout. In such examples, the processor may provide the first user interface, in real time, to each user of the plurality of users currently participating in the workout. As a result, each user may see his or her own activity scores, one or more additional performance metrics corresponding to the first sensor information, as well as the segmented timeline and the leaderboard.

Such an example method may also include receiving an indication of a second segment type. The second segment type may characterize and/or otherwise correspond to a second (e.g., different) workout activity currently being performed by the instructor in the studio. At least partly in response to receiving such an indication, the processor may update the segmented timeline to include a variety of different information corresponding to and/or indicative of the second segment type. In such examples, the processor may also receive a plurality of second sensor information. For example, such second sensor information may be associated with the particular user that performing the second workout activity simultaneously with the instructor. Such second sensor information may also be associated with the plurality of additional users performing the second workout activity. In such examples, the processor may determine one or more second activity scores based at least partly on the second sensor information associated with the particular user. The processor may also generate a second user interface. In such examples, the second user interface may include the video content of the instructor performing the second workout activity described above. Such a second user interface may also include an indication of total time remaining in the workout. Such a second user interface may further include the updated segmented timeline and the second activity score of the particular user. In some examples, the second user interface may also include an updated leaderboard that includes, among other things, second activity scores corresponding to the respective users of the plurality of additional users currently participating in the workout. In such examples, the processor may provide the second user interface, in real time, to each user of the plurality of users currently participating in the workout. As a result, each user may see his or her own second activity scores, one or more additional performance metrics corresponding to the second sensor information, as well as the updated segmented timeline and the updated leaderboard.

In some examples, each of the above steps may be repeated multiple times until the processor receives an indication that the workout has been completed. At least partly in response to receiving such an indication, the processor may generate one or more composite video files. In an example embodiment, a composite video file may include, among other things, each of the previously generated user interfaces in sequence such that playback of the composite video file may result in playing back the entire workout. Additionally, the processor may store such a video file in a memory connected to and/or otherwise in communication with the processor. The processor may also store the first sensor information, second sensor information, and/or any additional sensor information received during the various workout segments.

In another example embodiment of the present disclosure, the segmented information may be used to render one or more graphics summarizing a user's workout. For example, a user may be provided with per-workout graphical user interfaces that provide, among other features, graphical representations of the user's performance during each segment of the workout. By way of non-limiting example, the performance may be determined based on sensor information from exercise equipment used to complete the workout and/or biometric sensors worn by or otherwise associated with the user.

BRIEF DESCRIPTION OF THE DRAWINGS

The detailed description is described with reference to the accompanying figures. In the figures, the left-most digit of a reference number identifies the figure in which the reference number first appears. The same reference numbers in different figures indicate similar or identical items.

DETAILED DESCRIPTION

Figure 1A:
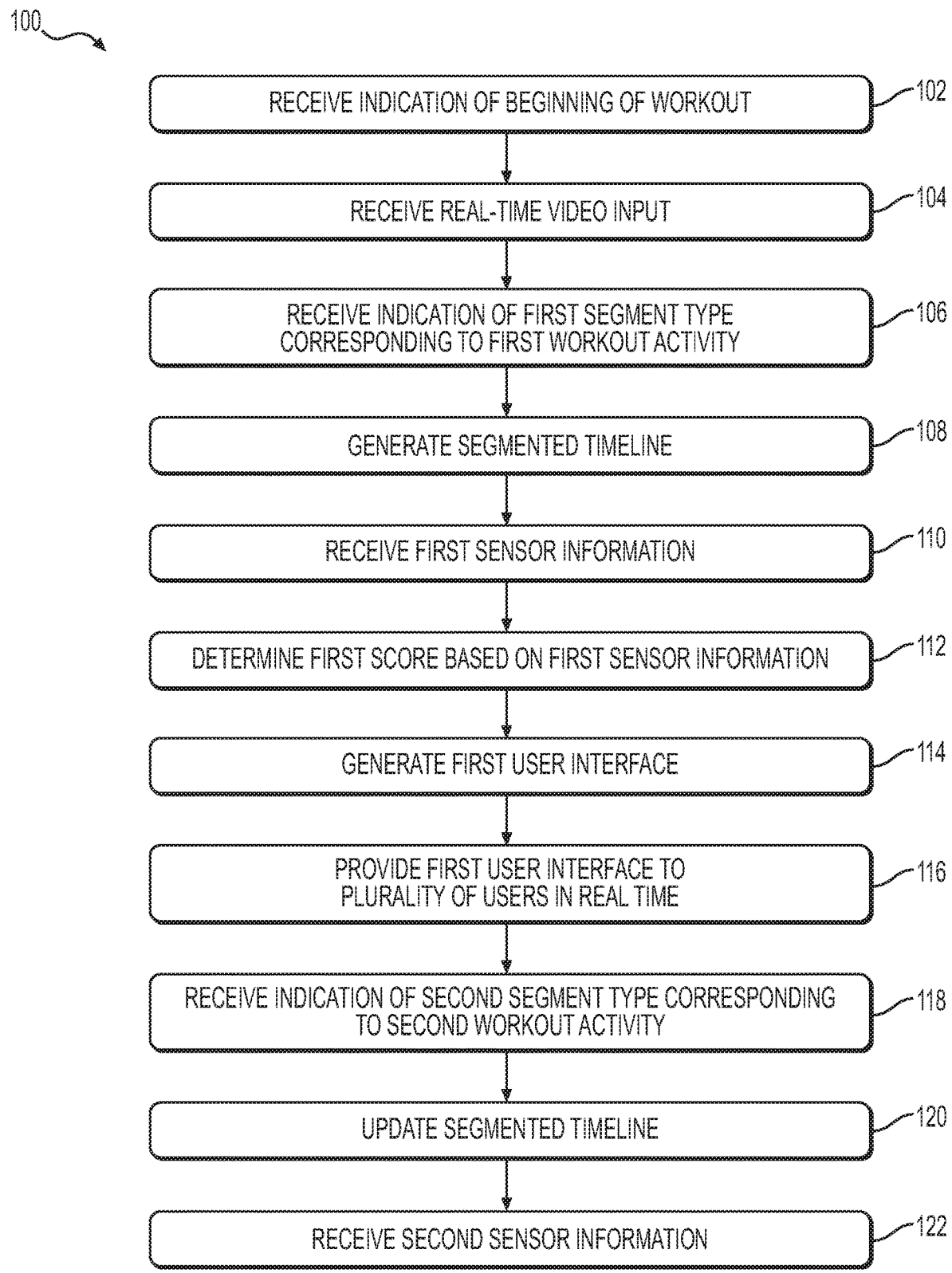
FIGS. 1a and 1b illustrate a flow chart corresponding to an example method of the present disclosure.

The following description is presented to enable any person skilled in the art to make and use aspects of the example embodiments described herein. For purposes of explanation, specific nomenclature is set forth to provide a thorough understanding of the present invention. Descriptions of specific embodiments or applications are provided only as examples. Various modifications to the embodiments will be readily apparent to those skilled in the art, and general principles defined herein may be applied to other embodiments and applications without departing from the spirit and scope of the present disclosure. Thus, the present disclosure is not intended to be limited to the embodiments shown, but is to be accorded the widest possible scope consistent with the principles and features disclosed herein.

Example embodiments of the present disclosure include networked exercise systems and methods whereby one or more exercise devices, such as treadmills, rowing machines, stationary bicycles, elliptical trainers, or any other suitable exercise equipment, may be equipped with an associated local system that allows a user to fully participate in live instructor-led or recorded exercise classes from any location that can access a suitable communications network. The networked exercise systems and methods may include back-end systems with equipment including without limitation servers, digital storage systems, and other hardware as well as software to manage all processing, communications, database, and other functions. The networked exercise systems and methods may also include one or more studio or other recording locations with cameras, microphones, and audio and/or visual outputs where one or more instructors can lead exercise classes and in some embodiments where live exercise classes can be conducted, and where such live and previously recorded classes can be distributed via the communications network. In various embodiments there may be a plurality of recording locations that can interact with each other and/or with any number of individual users.

In various embodiments, the example exercise systems and machines describe herein provide for full interactivity in all directions. Whether remote or in the same location, instructors may be able to interact with users, users may be able to interact with instructors, and users may be able to interact with other users. Through the disclosed networked exercise systems and machines, instructors may be able to solicit feedback from users, and users may be able to provide feedback to the instructor, vote or express opinions on different choices or options, and communicate regarding their experience. Such example exercise systems and machines allow for interaction through all media, including one or more video channels, audio including voice and/or music, and data including a complete range of performance data, vital statistics, chat, voice, and text-based and other communications.

In various embodiments, the exercise systems and machines described herein also allow an unlimited number of remote users to view and participate in the same live or recorded content simultaneously, and in various embodiments they may be able to interact with some or all of the other users viewing same content. Remote users can participate in live exercise classes offered from any available remote recording location, or they can access previously recorded classes archived in the system database. In various embodiments, a plurality of remote users can simultaneously access the same recorded class and interact with each other in real time, or they can access the same recorded class at different times and share data and communications about their performance or other topics.

Thus, the networked exercise systems and machines, and the corresponding methods described herein, provide for content creation, content management and distribution, and content consumption. Various aspects of such exercise systems and machines, user interfaces that may be provided to users via such machines, and the potential interactions between such machines, will now be described in more detail.

Exercise Machine

Although not illustrated in the figures filed herewith, in various example embodiments of the present disclosure, a local system may include an exercise machine such as a stationary bicycle, a treadmill, an elliptical machine, a rower, or other exercise machine with integrated or connected digital hardware including one or more displays for use in connection with an instructor lead exercise class and/or for displaying other digital content. For ease of description, the exercise machine may be described and/or otherwise referred to herein as a "stationary bicycle" or a "cycle." However, as noted above, example exercise machines of the present disclosure may be any suitable type of exercise machine, including a rowing machine, treadmill, elliptical trainer, stair climber, etc.

In various example embodiments, the one or more displays may be mounted directly to the exercise machine or otherwise placed within view of a user. In various exemplary embodiments, the one or more displays allow the user to view content relating to a selected exercise class both while working out on the exercise machine and while working out in one or more locations near or adjacent to the exercise machine.

Additionally, digital hardware associated with the exercise machine may be connected to or integrated with the exercise machine, or it may be located remotely and wired or wirelessly connected to the exercise machine. Such digital hardware may include digital storage (e.g., memory), one or more processors or other like computers or controllers, communications hardware, software, and/or one or more media input/output devices such as displays, cameras, microphones, keyboards, touchscreens, headsets, and/or audio speakers. In various exemplary embodiments these components may be connected to and/or otherwise integrated with the exercise machine. All communications between and among such components of the digital hardware may be multichannel, multi-directional, and wireless or wired, using any appropriate protocol or technology. In various exemplary embodiments, the digital hardware of the exercise machine may include associated mobile and web-based application programs that provide access to account, performance, and other relevant information to users from local or remote exercise machines, processors, controllers, personal computers, laptops, mobile devices, or any other digital device or digital hardware. In any of the examples described herein, the one or more controllers, processors, and/or other digital hardware associated with the exercise machine may be operable to perform one or more functions associated with control logic of the exercise machine. Such control logic may comprise one or more rules, programs, or other instructions stored in a memory of the digital hardware. For example, one or more processors included in the digital hardware may be programmed to perform operations in accordance with rules, programs, or other instructions of the control logic, and such processors may also be programmed to perform one or more additional operations in accordance with and/or at least partly in response to input received via one or controls of the exercise machine and/or via one or more sensors of the exercise machine.

For example, in some embodiments the exercise machine may include one or more sensors configured to sense, detect, measure, and/or otherwise determine various performance metrics from both the exercise machine and the user, instantaneously and/or over time. For example, the exercise machine may include one or more sensors that measure a rotational speed of a flywheel, motor, track, belt, pedals, and/or other rotational components of the exercise machine. One or more such sensors may also measure a load or force applied to the one or more such components by the user. Such sensors may also measure and/or otherwise determine an amount of energy expended by the user, a power output of the exercise machine, a corresponding power output of the user, user weight, steps, distance, total work, repetitions, an amount of resistance applied to the motor or flywheel of the exercise machine, as well as any other suitable performance metric associated with, for example, a stationary bicycle or a treadmill. The exercise machine may also include sensors to measure user heart-rate, respiration, hydration, calorie burn, or any other physical performance metrics, or to receive such data from sensors provided by the user. Where appropriate, such performance metrics can be calculated as current/instantaneous values, maximum, minimum, average, or total over time, or using any other statistical analysis. Trends can also be determined, stored, and displayed to the user, the instructor, and/or other users. Such sensors may communicate with memory and/or processors of the digital hardware associated with the exercise machine, nearby, or at a remote location, using wired or wireless connections.

Display and User Interface

One or more displays connected to and/or otherwise associated with the exercise machine may be driven by a user input device such as a touchscreen, mouse, voice control, or other suitable input device. In some examples, the display or at least a portion thereof, may comprise a touchscreen configured to receive touch input from the user. The one or more displays may be any size, but optimally are large enough and oriented to allow the display of a range of information including one or more video streams, a range of performance metrics corresponding to the user, a range of additional performance metrics associated with one or more additional users exercising on exercise machines remote from the exercise machine, and a range of different controls.

In various exemplary embodiments the user can use the display or one or more user interfaces displayed on the display to selectively present a range of different information including live and/or archived video, performance data, and other user and system information. As will be described below, such user interfaces can provide a wide range of control and informational windows that can be accessed and removed individually and/or as a group by a click, touch, voice command, or gesture. In various exemplary embodiments, such windows may provide information about the user's own performance and/or the performance of other participants in the same class both past and present.

Example user interfaces presented via the display may be used to access member information, login and logout of the system, access live content such as live exercise classes and archived classes or other content. User information may be displayed in a variety of formats and may include historical and current performance and account information, social networking links and information, achievements, etc. The user interfaces described herein can also be used to access the system to update profile or member information, manage account settings such as information sharing, and control device settings.

An example user interface may also be presented on the one or more displays to allow users to manage their experience, including selecting information to be displayed and arranging how such information is displayed on the display. Such a user interface may present multiple types of information overlaid such that different types of information can be selected or deselected easily by the user. For example, performance metrics and/or other information may be displayed over video content using translucent or partially transparent elements so the video behind the information elements can be seen together with (i.e., simultaneously with) the performance metrics and/or other information itself. Further, example user interfaces may present a variety of screens to the user which the user can move among quickly using the provided user input device, including by touching if a touchscreen is used.

In any of the examples described herein, the processor and/or other components of the digital hardware may control the display and/or otherwise cause the display to display the various user interfaces of the present disclosure. For example, the processor or other components of the digital hardware may cause the display to display a user interface comprising a home screen that provides basic information about the system and/or the exercise machine, as well as available options. Such a home screen may provide direct links to information such as scheduled classes, archived classes, a leaderboard, instructors, and/or profile and account information. The home screen may also provide direct links to content such as a link to join a particular class. The user can navigate among the different portions of the home screen by selecting such links using the applicable input device such as by touching the touchscreen at the indicated location, or by swiping to bring on a new screen. An example user interface providing such a home screen may also provide other information relevant to the user such as social network information, and navigation buttons that allow the user to move quickly among the different screens in the user interface.

Figure 1B:
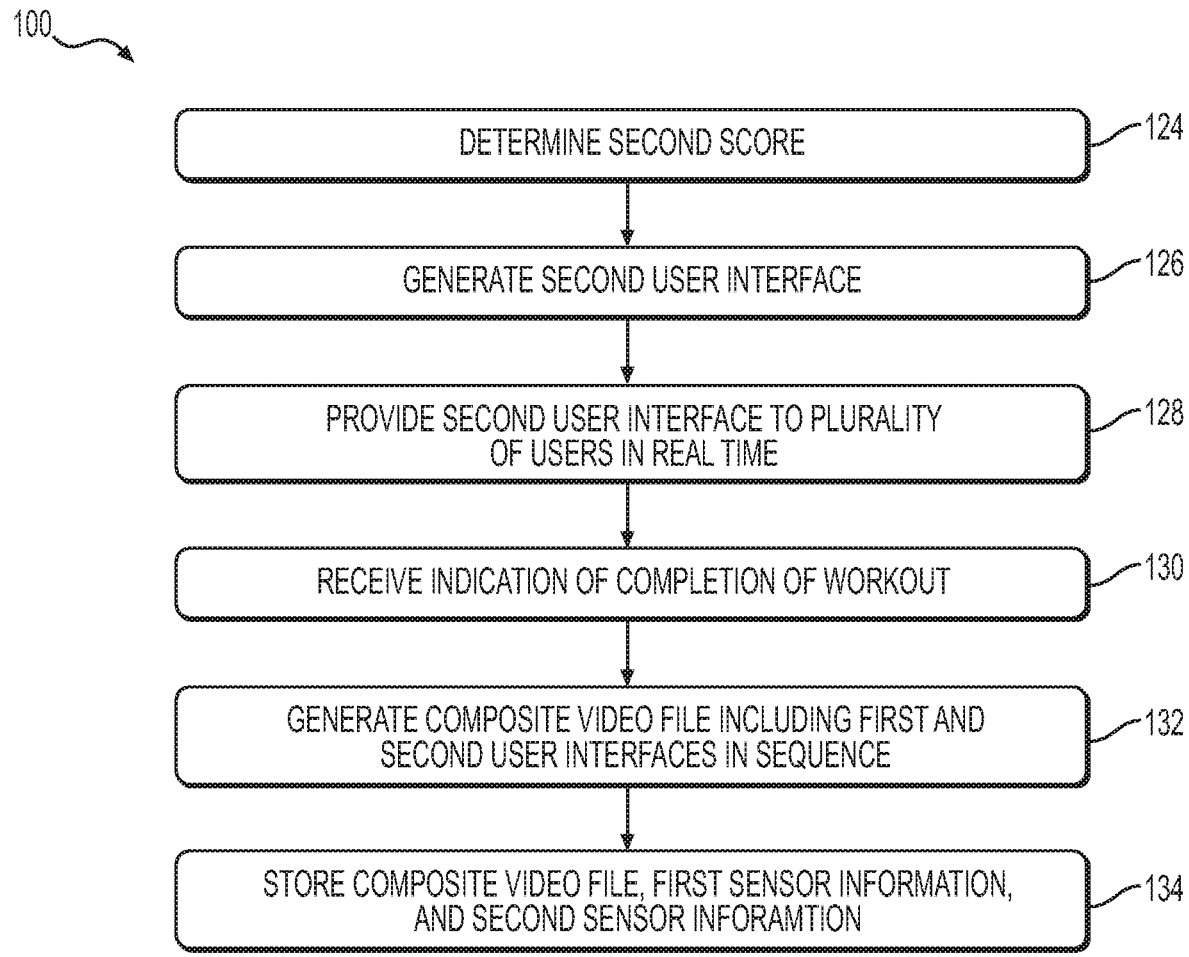

In various example embodiments, a processor of the present disclosure may be programmed and/or otherwise configured to generate and provide various user interfaces to a plurality of users such that the users may participate in live or archived workouts using the exercise machine. FIGS. 1*a* and 1*b* provide a flow chart illustrative of an example method 100 of the present disclosure in which a processor (either a remote processor or a processor local to one or more of the exercise machines) generates and provides such user interfaces. For example, at 102 the processor may receive an indication that an exercise class and/or other such workout is beginning. In such examples, the processor may comprise a central processor associated with a production studio and/or other performance facility at which an instructor is performing the exercise class. In such examples, a member of the production staff may provide such an input to the processor in order to begin, for example, recording video associated with the instructor performing the exercise class. In such examples, the processor may receive real-time video input at 104. The video input received at 104 may include a video feed from one or more digital cameras or other devices located within the performance studio. Such devices may be configured to record the instructor performing the exercise class, and/or other such workout. Such devices may also be configured to record one or more participants of the exercise class located within the performance studio. In any of the examples described herein, the video feed from such devices may include, among other things, runtime (e.g., elapsed time) and/or other information corresponding to the performance of the workout.

At 106, the processor may receive an indication of a first segment type corresponding to a first workout activity being performed by the instructor and/or the other participants at the performance studio. In such examples, the first segment type may be indicative of the actual workout activity (e.g., warm-up, jogging, lifting weights, cycling, cool down, etc.) being performed by the instructor during a first segment of the exercise class, and/or other such workout. In some examples, the processor may automatically determine such a first segment type based on, for example, voice recognition, gesture recognition, and/or other substantially automated processes. In other examples, the processor may receive the indication of the first segment type from a member of the production staff.

At 108, the processor may generate a segmented timeline indicative of the various workout activities being performed during the exercise class. For example, a segmented timeline may include one or more segments, and each individual segment may correspond to a respective workout activity. Such a timeline may also include an icon or other visual indicia corresponding to each respective segment. Such icons may indicate, correspond to, and/or otherwise identify the segment type, and/or the workout activity being performed during the respective segment. For example, in embodiments in which a first segment type received at 106 comprises "cycling," a corresponding first icon associated with a first segment of the segmented timeline generated at 108 may comprise an icon illustrating a participant riding a stationary bicycle. In some examples, such a segmented timeline may also include an indication of elapsed time and/or any other metrics that may be useful to a participant during an exercise class or other such workout. In some examples, at 108, the processor may automatically generate the segmented timeline using, for example, voice recognition, gesture recognition, and/or other substantially automated processes. In such embodiments, the processor may recognize audible commands provided by the instructor during the exercise class, gestures performed by the instructor, or other cues. In response, the processor may generate the segmented timeline by designating and/or establishing a corresponding time element or other such segment with the recognized cue. As part of this process, the processor may also associate a corresponding icon (e.g., a "cycling" icon in the example above) with the segment. Alternatively, in examples in which the segmented timeline is generated manually or semi-automatically, one or more of the processes above may be performed, a least in part, by a member of the production staff.

At 110, the processor may receive a plurality of first sensor information. For example, at 110, the processor may receive sensor information associated with a particular user of an exercise machine participating in the exercise class, and/or other such workout simultaneously with the instructor in real time. At 110, the processor may also receive such first sensor information from a plurality of additional exercise machine users participating in the exercise class simultaneously with the instructor and/or simultaneously with the particular user. Such sensor information may include, for example, at least one of speed, heart rate, distance, hydration, respiration, output, cadence, and/or any other performance metrics or other parameters described herein. It is understood that such first sensor information may be received by the processor at 110, via one or more networks, communications interfaces, mobile devices, wearable devices, monitors, and/or other devices used to connect the processor with one or more remote exercise machines and/or remote users participating in the exercise class.

At 112, the processor may determine a first score based at least partly on the first sensor information received at 110. For example, at 112 the processor may use such information as respective inputs into one or more neural networks, algorithms, and/or other components in order to generate a corresponding score. In such examples, the score determined at 112 may comprise a current output of a particular user. For example, as noted above such output may comprise a metric indicative of the energy expended by the particular user during the exercise class and/or other such workout. In some examples, such an output may be calculated based at least partly on a speed at which the user is peddling, and a resistance value, brake value, and/or other value indicative of a particular setting of a stationary bicycle. It is understood that the score determined at 112 may include one or more additional values such as an average output of the user, a total output of the user, a current to cadence, an average cadence, a current resistance, an average resistance, a current speed, an average speed, a distance, a number of calories burned, and/or any other similar metric. Further, at 112 the processor may determine additional scores corresponding to each of the respective plurality of additional users participating in the exercise class and/or other workout.

Figure 2:
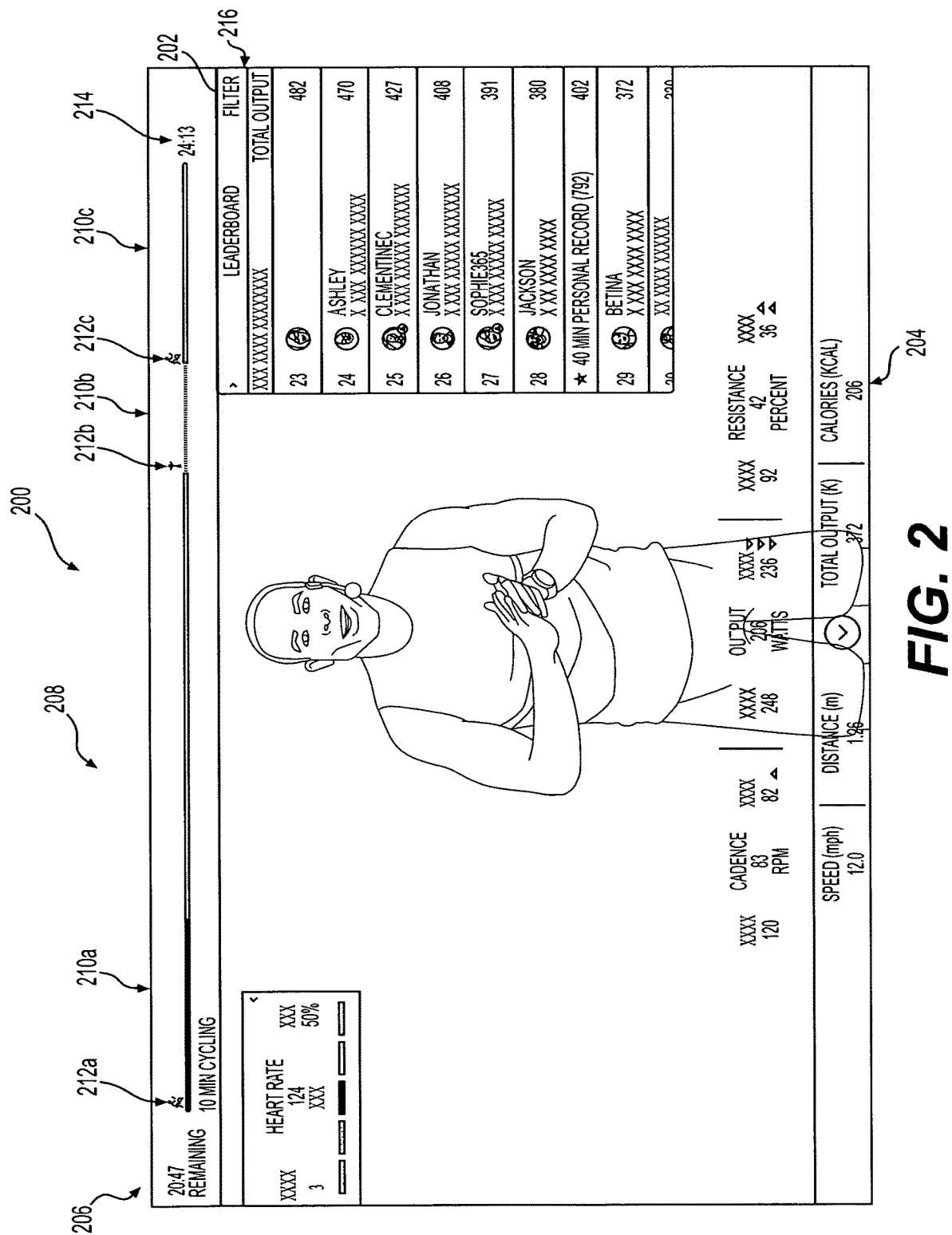
FIG. 2 illustrates an example user interface of the present disclosure. The user interface shown in FIG. 2 corresponds to the method described herein with respect to FIGS. 1a and 1b.

At 114, the processor may generate a first user interface. Such an example user interface 200 is illustrated in FIG. 2. As shown in FIG. 2, an example user interface 200 may include the video feed and/or other video input received at 104. Such video input may be shown as the background video 202 full-screen or in a sub-window on the display of the exercise machine. The user interface 200 may also include additional information elements 204 provided on different parts of the display screen to indicate performance metrics including distance, speed, mile pace of the user, incline, elevation, resistance, power, total work, output, cadence, heart rate, respiration, hydration, calorie burn, and/or any custom performance scores that may be developed. The displayed information elements 204 may also include the trend or relationship between different performance metrics. For example, the display can indicate a particular metric in a color that indicates current performance compared to average performance for a class or over time, such as red to indicate that current performance is below average or green to indicate above average performance. Trends or relative performance can also be shown using color and graphics, such as a red down arrow to show that current performance is below average.

In various exemplary embodiments, the user interface 200 may also include information that supports or supplements the background video 202 and/or the information elements 204. For example, the user interface 200 may include a segmented timeline 208 generated at 108, and the segmented timeline 208 may be illustrated together with at least part of the background video 202 and/or the information elements 204. As shown in FIG. 2, an example segmented timeline 208 may include one or more segments 210a, 201b, 210c . . . 210n (collectively, "segments 210") corresponding to respective portions or parts of the exercise class. The size, length, width, height, relative position, color, opacity, and/or other configurations of such segments 210 may be representative of, for example, the length of the corresponding portions or parts of the exercise class. The segmented timeline 208 may also provide an indication 214 of elapsed time and/or in indication 206 of remaining time for the present workout segment and/or for the exercise class generally. The segmented timeline 208 may also include one or more icons or other such visual indica 212a, 212b, 212c . . . 212n (collectively, "indicia 212") indicating a particular workout activity being performed and/or equipment required during a respective portion or part of the exercise class. In any of the examples described herein, such segmented timelines 208 may also include one or more lists or windows identifying and/or describing upcoming workout segments or features, instructional information such as graphics or videos demonstrating how to properly perform exercises, or other information relevant to the exercise class in progress.

As shown in FIG. 2, the user interface 200 may further include a leaderboard 216 to allow the user to see their performance in comparison to others taking and/or participating in the same exercise class. In various exemplary embodiments, a leaderboard 216 may comprise a separate window overlaid on and/or otherwise displayed together with the background video 202 and/or the information elements 204. An example leaderboard 216 may be configured to display the relative performance of all participants, and/or of one or more subgroups of participants. For example, the user may be able to select a leaderboard 216 that shows the performance of participants in a particular age group, male participants, female participants, male participants in a particular age group, participants in a particular geographic area, etc. Users may have the ability to individually curate and/or otherwise configure a leaderboard 216, or have the system curate a leaderboard 216 by selecting an appropriate group of participants relative to the user. Users may be able to curate their own leaderboards 216 for specific previously recorded classes to create a leaderboard 216 that provides the maximum personal performance incentive to the user.

The leaderboard 216 may be fully interactive, allowing the user to scroll up and down through the participant rankings, and to select a participant to access their detailed performance data, create a connection such as choosing to follow that participant, or establish direct communication such as through an audio and/or video connection. The leaderboard 216 may also display the user's personal best performance in the same or a comparable class, to allow the user to compare their current performance to their previous personal best. The leaderboard 216 may also highlight certain participants, such as those that the user follows, or provide other visual cues to indicate a connection or provide other information about a particular entry on the leaderboard. In various exemplary embodiments, the leaderboard 216 will also allow the user to view their position and performance information at all times while scrolling through the leaderboard 216.

With continued reference to FIG. 1a, at 116 the processor may provide the first user interface generated at 114 to one or more users participating in the current exercise class, and/or other such workout. For example, the processor may stream the user interface 200 to a plurality of exercise machines located remotely from the performance studio and/or other location of the processor. In other examples, the processor may provide a plurality of exercise machines with access to the user interface 200 via one or more networks, cloud configurations, and/or other communications devices. In this way, each user of the plurality of users may consume the user interface 200 simultaneously and in real-time. Additionally, it is understood that each such user may be able to view the background video 202, together with his/her own information elements 204 (e.g., the one or more scores of a particular user generated at 112), the segmented timeline 208 generated at 108, as well as the leaderboard 216.

Is understood that the various exercise classes described herein may include various different workout activities, and that each such workout activity may trigger the generation of a new respective segment in the segmented timeline 208. For example, at 118 the processor may receive an indication of a second segment type corresponding to a second workout activity being performed by the instructor and/or the other participants at the performance studio. In such examples, the second segment type may be indicative of a second actual workout activity (e.g., warm-up, jogging, lifting weights, cycling, cooldown, etc.) being performed by the instructor during a second segment of the exercise class, and the second workout activity may be different from the first workout activity described above. In some examples, the processor may automatically determine such a second segment type based on, for example, voice recognition, gesture recognition, and/or other substantially automated processes. In other examples, the processor may receive the indication of the second segment type from a member of the production staff.

At 120, the processor may update the segmented timeline 208 generated at 108. In some examples, updating the segmented timeline 208 at 120 may comprise generating a second (e.g., updated) segmented timeline. Regardless, the updated segmented timeline generated at 120 may include an additional segment (e.g., segment 210b) indicative of the second workout activity being performed during the additional segment of the exercise class. The updated segmented timeline generated at 120 may also include an additional icon or other visual indicia (e.g., indicia 212b) corresponding to the additional segment 210b. In some examples, such an updated segmented timeline may also include an indication 214 of elapsed time and/or any other metrics that may be useful to a participant during an exercise class or other such workout.

At 122, the processor may receive a plurality of second sensor information. For example, similar to the process described above with respect to 110, at 122 the processor may receive sensor information associated with a particular user of an exercise machine participating in the exercise class, and/or other such workout simultaneously with the instructor in real time. At 122, the processor may also receive such second sensor information from the plurality of additional exercise machine users participating in the exercise class simultaneously with the instructor and/or simultaneously with the particular user. Such second sensor information may be received by the processor at 122 via one or more networks, communications interfaces, mobile devices, wearable devices, monitors, and/or other devices used to connect the processor with one or more remote exercise machines and/or remote users participating in the exercise class.

At 124, the processor may determine a second score based at least partly on the second sensor information received at 120. For example, at 124 the processor may use such second sensor information as respective inputs into one or more neural networks, algorithms, and/or other components in order to generate a corresponding second score. In such examples, the second score determined at 124 may comprise any of the score(s) described above with respect to 112. Further, at 124 the processor may determine additional second scores corresponding to each of the respective plurality of additional users participating in the exercise class and/or other workout.

At 126, the processor may generate a second user interface. Such an example second user interface may include any of the information described above with respect to the user interface 200 illustrated in FIG. 2. Further, at 128 the processor may provide the second user interface generated at 126 to one or more users participating in the current exercise class, and/or other such workout. For example, similar to the process described above with respect to 116, the processor may stream the second user interface to a plurality of exercise machines located remotely from the performance studio and/or other location of the processor. In other examples, at 128 the processor may provide a plurality of exercise machines with access to the second user interface via one or more networks, cloud configurations, and/or other communications devices. In this way, each user of the plurality of users may consume the second user interface simultaneously and in real-time.

It is understood that at least the steps 118-128 may be repeated until a particular exercise class and/or other such workout is completed. At 130, the processor may receive an indication of completion of the workout. For example, the processor may automatically determine that the current exercise class has been completed based on, for example, voice recognition, gesture recognition, and/or other substantially automated processes. In other examples, the processor may receive the indication that the exercise class is completed from a member of the production staff. At least partly in response to receiving such an indication, the processor may, at 132, generate a composite video file that includes each of the user interfaces generated during the exercise class and arranged in sequential (e.g., chronological) order. Such of composite video file may be configured such that upon playback of the video file, at least the background video, and/or other video input received by the processor during the exercise class (e.g., at 104) may be played back seamlessly the user viewing the composite video file. In any of the examples described herein, such a composite video file may comprise an audio track, a video track, and/or other components comprising captured audio and video of the instructor (and in some instances, one or more participants) performing the exercise class. In such examples, at 132 the processor may embed, link, combine, and/or otherwise associate the segmented timeline, as metadata, with the captured audio and video (e.g., with the audio track and/or with the video track). In such examples, as the composite video file is streamed and/or otherwise provided to one or more users, the exercise machines or other electronic devices of the user receiving the composite video file may present the segmented timeline together with the captured audio and video as the user interface is displayed.

In alternate embodiments, on the other hand, the segmented timeline may be stored separately from the captured audio and video. In such examples, the segmented timeline may be streamed and/or otherwise provided to one or more users together with the captured audio and video. In such embodiments, the exercise machines or other electronic devices of the user receiving the audio and video content may present the segmented timeline together with such content as the user interface is displayed.

At 134, the processor may store the composite video file, the first sensor information, the second sensor information, and/or any of the information received during the exercise class. In this way, the composite video file, the first sensor information, the second sensor information, and/or any other such additional information may be recalled by one or more additional users for viewing and/or other uses.

Figure 3A:
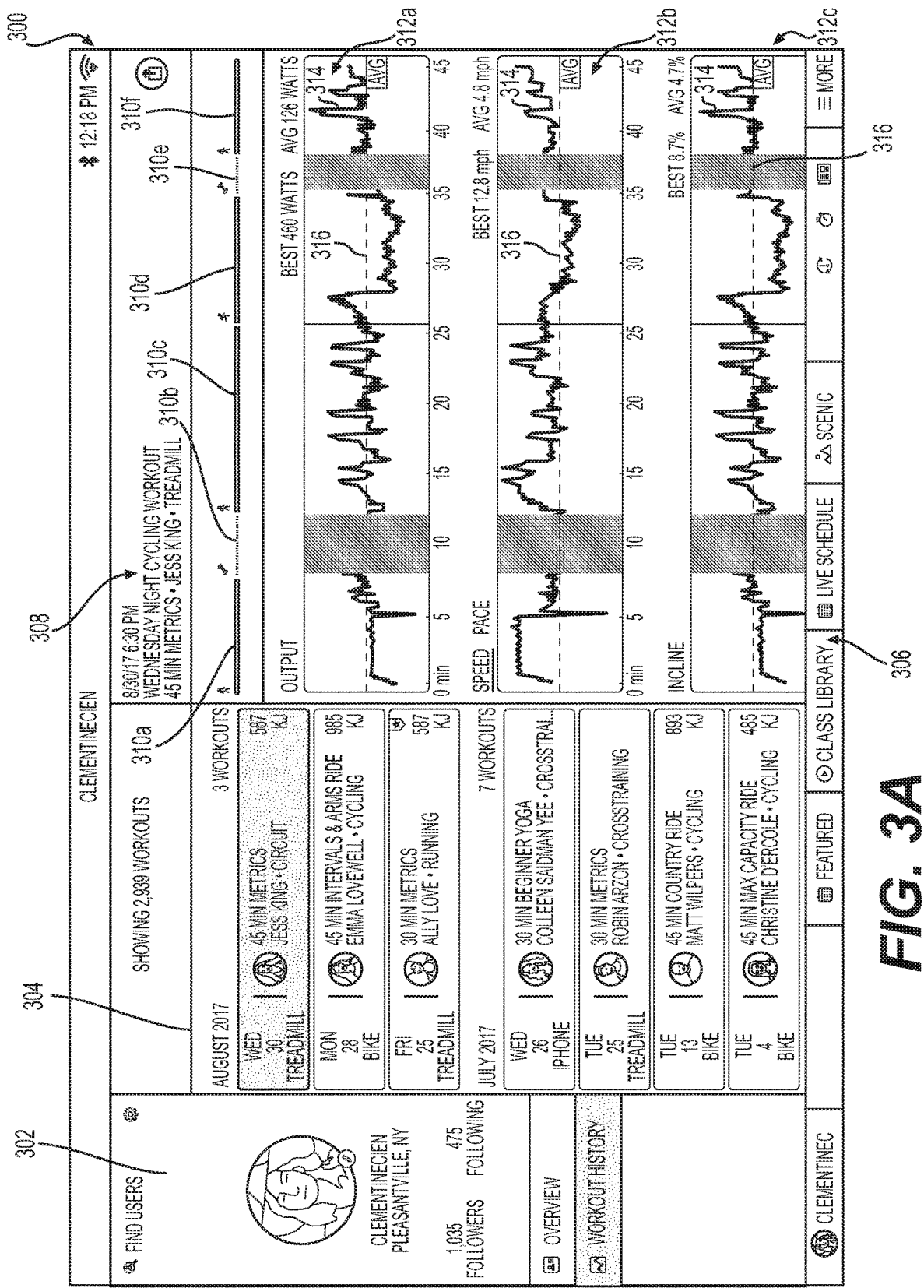
FIGS. 3A and 3B illustrate additional example user interfaces of the present disclosure.
Figure 3B:
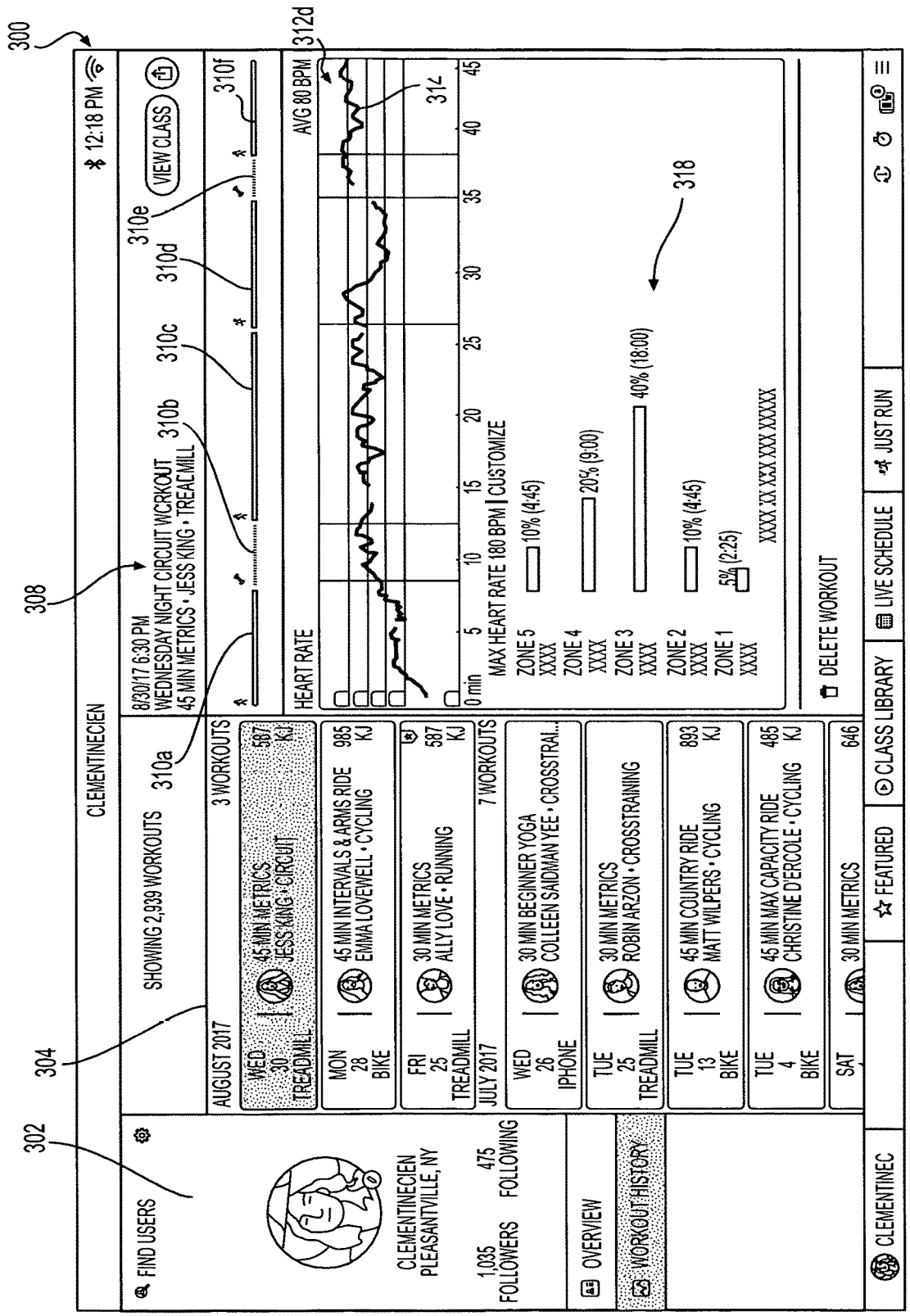

FIGS. 3A and 3B illustrate examples of a user interface 300. In implementations of this disclosure, the user interface 300 may be a workout summary interface. As illustrated, the user interface 300 may include a plurality of sections or windows, including a user identification window 302, a workout window 304, and a workout summary window 306. Although the illustrated interface 300 includes the three windows 302, 304, 306, more or fewer windows may be present in the interface.

The user identification window 302 may include information about the user. Such information may include, among other things, an identification of the user, e.g., a picture, name, avatar, or the like, a number of followers the user has, a number of fellow participants that the user is following, the total lifetime runs, rides, circuits, or other workouts in which the user has completed and/or been a participant, an identification of achievements or rewards the user has earned, records or goals, a timeline of the user's recent workout activity, and/or other such general information associated with the user and/or the user's workout activities. In further examples, the information provided in the user identification window 302 may be provided in alternative formats, windows, or locations.

The workout window 304 may include information about workouts, including available classes and/or classes already completed by the user. In some implementations, the workout window 304 may list upcoming live classes or available, pre-recorded on-demand classes. The workout window 304 may also include associated filters and/or search tools allowing the user to customize the information contained in the window. In the illustrated embodiment, the workout window 304 includes a listing of workouts or other exercise classes performed by the user. The workouts are illustrated as arranged in a chronological list, although the workouts may be otherwise represented. Moreover, the workout window 304 may further include one or more of a score achieved by the user during each exercise class (e.g., an output score), the date and/or time of the class, an identification of the instructor, and/or other information. The user interface 300 may also include one or more additional windows and/or other formats useful in providing additional information regarding the workout history of the user.

The workout summary window 306 may provide information about a specific workout, including performance metrics indicative of the user's performance for the specific workout. For instance, the workout summary window 306 may include information about a completed workout selected in the workout window 304. The workout summary window 306 may include workout information 308 indicative of the workout detailed in the workout summary window 306. By way of non-limiting example, the workout information 308 may include one or more of a date, time, duration, workout name, instructor name, workout type (e.g., cycling, walking/running, combined workout) targeted muscle group(s) for the workout, and/or other information.

The workout summary window 306 also includes a plurality of graphical segment identifiers 310a-310f, each indicative of a discrete portion of the associated workout. For instance, as described above, workouts may be segmented in real-time during a live recording of the workout. In the illustrated example, the workout summary 306 corresponds to a treadmill-based workout that includes a first walking segment represented by the segment identifier 310a, a weight-training segment represented by the segment identifier 310b, a second walking segment represented by the segment identifier 310c, a running segment represented by the segment identifier 310d, a second weight-training segment represented by the segment identifier 310e and a final walking segment represented by the segment identifier 310f. Together, the segment identifiers 310a-310f provide a graphical representation of the entire workout.

The workout summary window 306 may also include one or more workout summary graphics 312a-312c (FIG. 3A) and/or workout summary graphics 312d (FIG. 3B) illustrated in association with the segment identifiers 310-310f. More specifically, in FIG. 3A, a first workout summary graphic 310a shows an output (e.g., a measure of performance, which may be a combination of one or more factors normalized across participants) for the user over the duration of the workout, the second workout summary graphic 310b shows a speed for the user over the duration of the workout, and the third workout summary graphic illustrates an incline of the user's treadmill over the duration of the workout. As illustrated, the graphics 312a-312c may be rendered as graphs including a plot line 314 indicating user performance throughout the workout. The plot line 314 may represent sensor information received from sensors associated with exercise equipment used by the user. For instance, speedometers, accelerometers, position sensors, gyroscopes, biometric sensors, or the like, may sense information associated with the exercise equipment and/or the user, which information may be used to create the plot line 314.

As illustrated in each of the graphics 312a, 312b, the plot line 314 may not be provided for segments of the workout. More specifically, the plot lines are non-existent for portion of the workout corresponding to the graphical segment identifiers 310b and 310e. For example, the metrics shown in graphics 312b and 312c may be determined based on treadmill-mounted sensors, whereas those segments of the workout are intended to be done off the treadmill. In other implementations, different sensor data, e.g., associated with the user or with the weights used for those portions, may collect non-treadmill information useful for creating an additional graphic associated with the workout. In some examples, such non-treadmill information may be used to determine a plot line for the output. in the grayed-out areas of the graphic 312a.

The graphics 312a-312c may also include an axis 316 representing an average value for the specific metric. In the illustrated implementations, the axis 316 indicates an average of the user throughout the workout. However, in other embodiments, the axis 316 may indicate an average for all participants of the workout, e.g., so the user can see her performance relative to other participants. In other implementations, the axis 316 may not be representative of an average, but may instead be a predetermined reference value, which may include a target value or a value associated with a previous undertaking of the workout.

Graphics other than the graphics 312a-312c may also or alternatively be provided in the workout summary window 306. For example, as illustrated in the graphic 312b, the user may be able to select a "pace" graphic instead of the illustrated "speed" graphic. For example, the pace may show a minute-per-mile plot as opposed to the illustrated mile-per-hour. Moreover, the displayed and/or available graphics may vary based on the workout type and/or available information. As noted above, graphics associated with weight-based segments of a workout may be rendered based on information from user-worn sensors or sensors disposed on weights used to perform those segments of the workout. Moreover, sensors on other types of equipment may also be used. By way of non-limiting example, a workout may include segments executed on a cycle, such as a stationary cycle. Sensors associated with the cycle may be used to render the graphics. Other modifications and alternatives may also be appreciated by those having ordinary skill in the art, with the benefit of this disclosure.

Moreover, FIG. 3B illustrates another workout summary graphic 312d, in which the plot line 314 charts the user's heart rate over the course of the workout. For instance, the heart rate may be sensed via a heart rate monitor worn by or otherwise associated with the user. As illustrated, sensor information may be received across all segments of the workout, thereby providing to information whether the user is using the exercise equipment (e.g., the treadmill) or is away from the equipment (e.g., doing the weight-training segments of the workout.

FIG. 3B also illustrates that the workout summary window 306 may include additional graphics 318, which may present additional or alternative information relative to the workout. For example, the additional graphics 318 may include other representations associated with the user's heartrate, including a graphic illustrative of the user's heart rate relative to predetermined heart rate zones.

Figure 4:
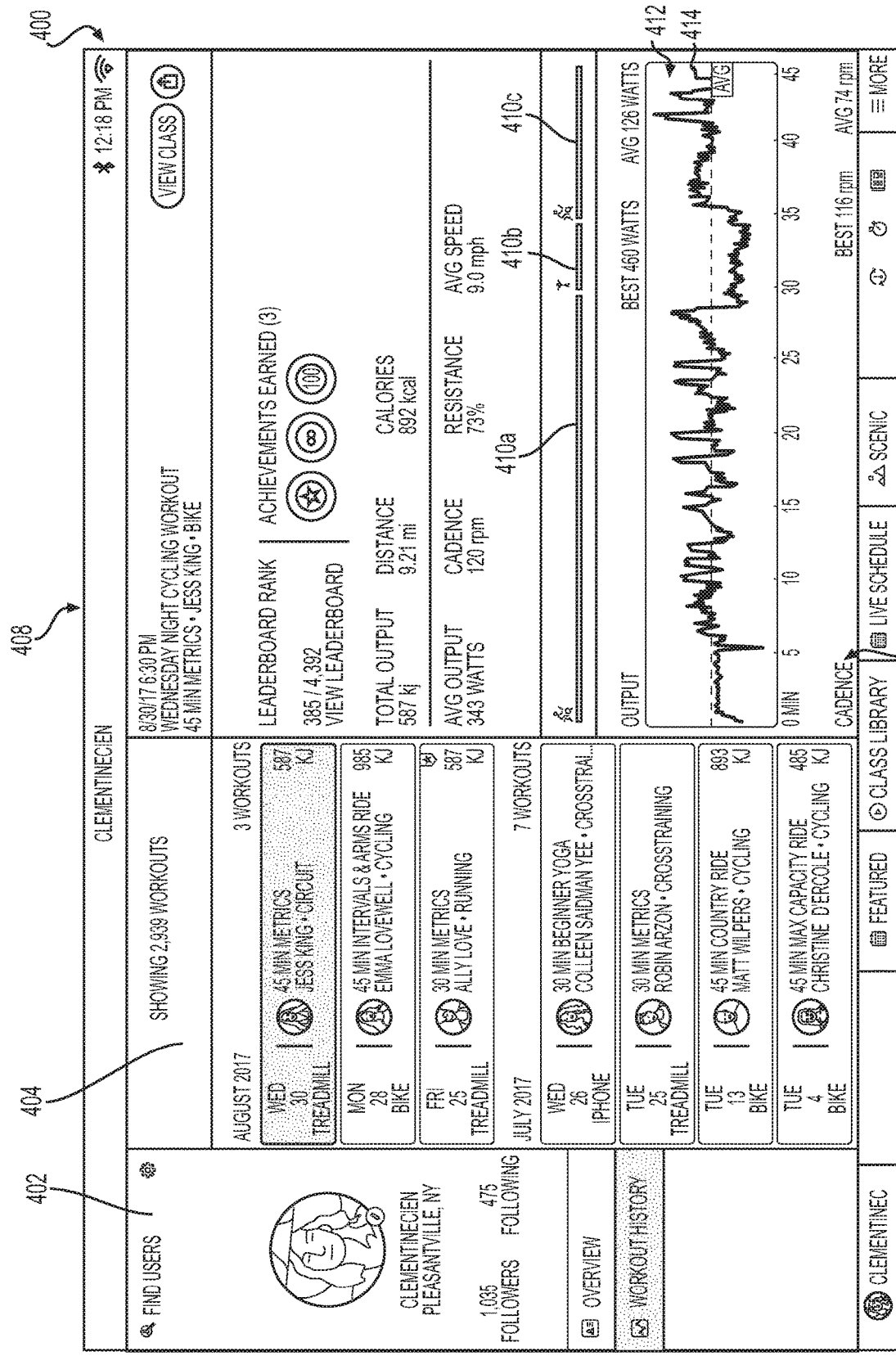
FIG. 4 illustrates another example user interface of the present disclosure.

FIG. 4 is illustrative of a user interface 400 similar to the user interface 300 discussed above. However, the user interface 400 is associated with a stationary bicycle and, therefore, a cycling workout. The user interface 400 includes a user identification window 402, a workout window 404 and a workout-specific workout summary window 406. These windows general correspond to the windows 302, 304, 306, respectively, described above. The workout summary window 406 also includes workout information 408, similar to the workout information 308, and workout segment identifiers 410a-410c, like the workout segment identifiers 310a-310j described above. The workout segment identifier 410a is associated with a first cycling segment of the workout, the workout segment identifier 410b is associated with a weight-based training segment of the workout, and the workout segment identifier 410c is associated with a second cycling segment of the workout. Together, the workout segment identifiers 410a-410c illustrate a workout timeline.

The workout summary window 406 also includes a workout performance graphic 412, which associates performance with the segmented timeline. For instance, the performance graphic 412 includes a plot line 414 indicative of an "output" metric for the user during the workout. Other graphics may also or alternatively be rendered in the window 406. For instance, the user's speed, cadence, pedal resistance, and the like may be provided for the workout.

Figure 5:
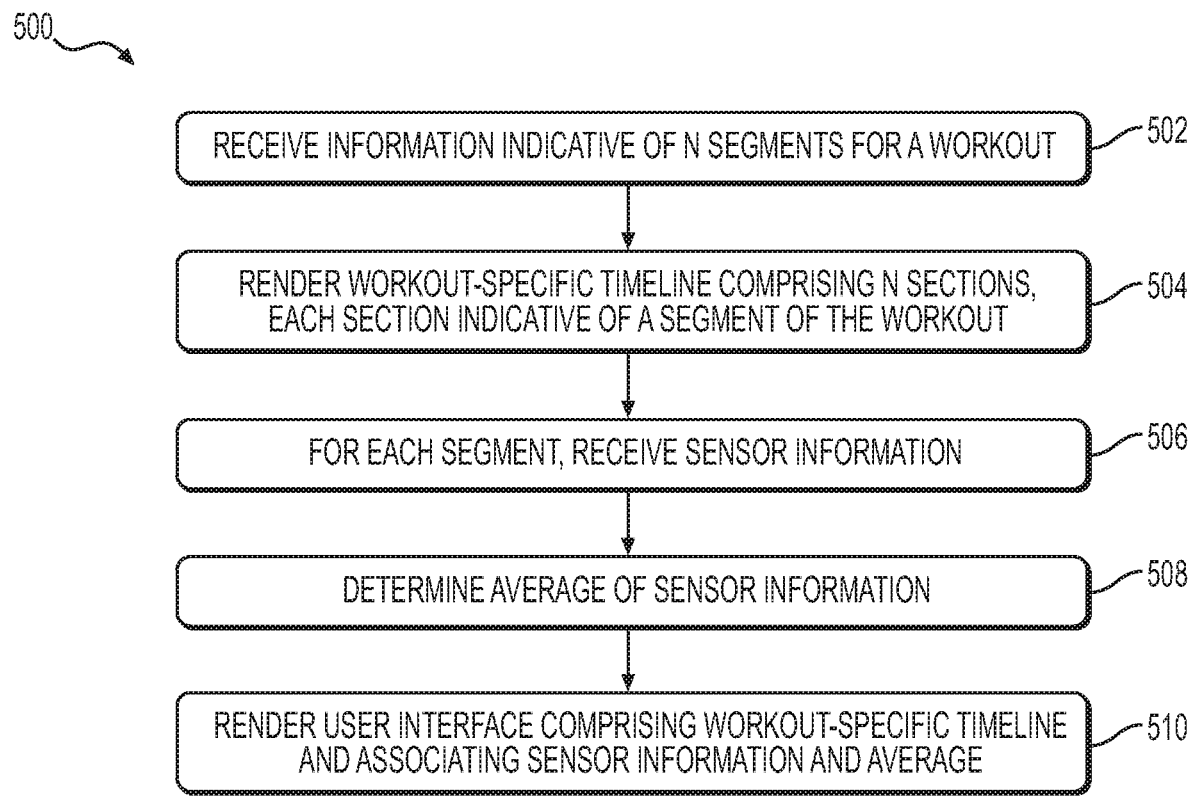
FIG. 5 is an example flow chart corresponding to an example method for rendering portions of a user interface, such as portions illustrated in FIGS. 3A, 3B, and/or 4.

FIG. 5 is a flow chart illustrative of a process 500 for rendering workout-related information via a graphical user interface. More specifically, the process 500 may be useful to render information such as the workout summary window 306.

At 502, the process 500 includes receiving information indicative of a number of segments of a workout. As detailed above, workouts may be divided into a plurality of segments. For instance, the segments may be based on a type of equipment to be used, e.g., a treadmill, a stationary cycle, and/or a type of exercise, e.g., cycling, weight training, stretching, and the like. In the example workout summary window 306 described above, the workout is divided into seven segments.

At 504, the process 500 includes rendering a workout-specific timeline. The timeline comprises an indication for each of the N segments. For instance, in the example described above in connection with FIGS. 3A and 3B, the workout segment identifiers 310a-310j each indicate respective segments of a workout.

At 506, the process 500 includes receiving sensor information for each of the segments. Thus, with reference to the workout detailed in the workout summary window 306, sensor information associated with the speed at which the belt of the treadmill is moving may be received for each segment. As will be appreciated, when the user is undertaking the weight-based segments of the workout, no sensor information may be generated, because the belt should be stopped. Moreover, sensor information associated with the position of the belt may be received for each segment, i.e., to indicate the incline of the treadmill. Depending upon the type of the equipment used and/or the type of data desiring to be detailed, different types of sensor information may be received at 506. For example, sensor information from a stationary cycling apparatus may include revolutions per minute, a resistance against pedaling, e.g., simulating a gear, and/or speed. Biometric information may also be received at 506.

At 508, the process 500 may include determining an average of the sensor information. In the workout summary window 306, the summary graphics 312 define the axis 318 as the average of the respective metric. This average may be determined at 508. In other implementations, the average may be determined across global data, such as across multiple participants undertaking the workout and/or multiple iterations of the workout by the user.

The process 500 also includes, at 508, rendering a user interface comprising the workout-specific timeline, as well as the sensor information and the reference value(s), e.g., the average. For instance, 508 may include rendering the workout segment identifiers 310a-310j and the summary graphics 312a-312d. Additionally, any of the steps included in the process 500 could be used to render one or more segments or other portions of the user interface 400 illustrated in FIG. 4.

Figure 6:
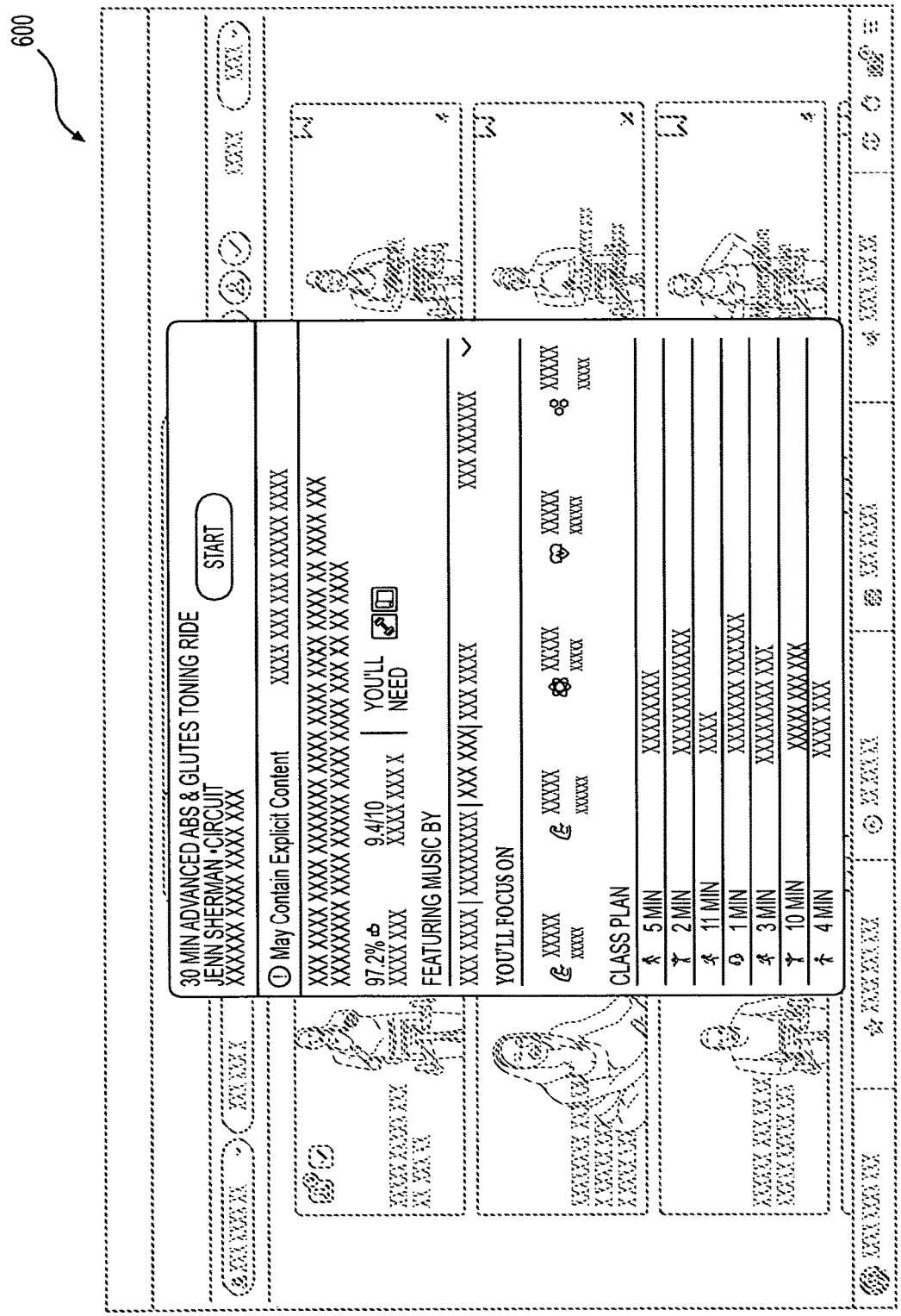
FIG. 6 illustrates another example user interface providing information related to various segments of an example exercise class.

FIG. 6 illustrates still another example user interface 600 of the present disclosure. The user interface 600 provides information (e.g., duration, description, etc.) related to one or more of the individual segments of an exercise class of the present disclosure. Such a user interface 600 may be provided to a user, via one or more of the processes 200, 500 described herein, in order to assist a user in selecting a particular archived (e.g., on-demand) exercise class for viewing via a display of an exercise machine.

Example Clauses

The example clauses below are representative and/or descriptive of example embodiments of the present disclosure. In particular, the example clauses below, either alone or in combination, may describe one or more example embodiments of the present disclosure.

A. A method, comprising: receiving, with a processor, a video input; receiving, with the processor, an indication of a first segment type corresponding to a first workout activity being performed in the video input; generating a segmented timeline with the processor, the segmented timeline including a plurality of segments, and at least one segment of the plurality of segments corresponding to the first workout activity; generating a user interface with the processor, the user interface including the segmented timeline displayed together with at least part of the video input; and providing the user interface to a plurality of exercise machines, with the processor, and via a network.

B. The method of clause A, wherein the segmented timeline includes first visual indicia indicative of the first workout activity, and second visual indicia indicative of a second workout activity following the first workout activity.

C. The method of any of the above clauses, either alone or in combination, wherein the user interface further includes a leaderboard displayed together with the segmented timeline and the at least part of the video input, the leaderboard indicating relative performances, of a plurality of participants, in the first workout activity being performed in the video input.

D. The method of any of the above clauses, either alone or in combination, wherein the user interface comprises a first user interface, the method further comprising: generating a second user interface with the processor, the second user interface including the segmented timeline displayed together with at least an additional part of the video input; and generating composite video file with the processor, the composite video file including the first user interface and the second user interface arranged in chronological order.

E. The method of any of the above clauses, either alone or in combination, wherein the video input comprises a video feed received from at least one recording device disposed within a performance studio.

F. The method of any of the above clauses, either alone or in combination, further comprising: receiving sensor information with the processor, the sensor information including first sensor information associated with a first user participating in an exercise class using a first exercise machine of the plurality of exercise machines, the first user participating in the exercise class by consuming the user interface.

G. The method of any of the above clauses, either alone or in combination, further comprising: receiving second sensor information with the processor, the second sensor information associated with a second user participating in the exercise class, simultaneously with the first user, using a second exercise machine of the plurality of exercise machines remote from the first exercise machine; and generating a leaderboard indicating a first performance metric of the first user and a second performance metric of the second user, the first performance metric being determined based at least in part on the first sensor information, and the second performance metric being determined based at least in part on the second sensor information.

H. The method of any of the above clauses, either alone or in combination, wherein the first sensor information comprises at least one of speed, heart rate, distance, hydration, respiration, cadence, and output of the first user, and wherein the first sensor information is received by the processor via the network.

I. A system, comprising: a processor; and an exercise machine in communication with the processor via a network; and memory in communication with the processor and storing instructions which, when executed by the processor, cause the processor to perform operations comprising: receiving a video input, receiving an indication of a first segment type corresponding to a first workout activity being performed in the video input, generating a segmented timeline, the segmented timeline including a plurality of segments, and at least one segment of the plurality of segments corresponding to the first workout activity, generating a user interface, the user interface including the segmented timeline displayed together with at least part of the video input, and providing the user interface to the exercise machine via the network.

J. The system of clause I, wherein the segmented timeline includes first visual indicia indicative of the first workout activity, and second visual indicia indicative of a second workout activity following the first workout activity.

K. The system of any of the clauses above, either alone or in combination, wherein the user interface further includes a leaderboard displayed together with the segmented timeline and the at least part of the video input, the leaderboard indicating relative performances, of a plurality of participants, in the first workout activity being performed in the video input.

L. The system of any of the clauses above, either alone or in combination, wherein the user interface comprises a first user interface, the operations further comprising: generating a second user interface, the second user interface including the segmented timeline displayed together with at least an additional part of the video input; and generating composite video file, the composite video file including the first user interface and the second user interface arranged in chronological order.

M. The system of any of the clauses above, either alone or in combination, wherein the video input comprises a video feed received from at least one recording device disposed within a performance studio.

N. The system of any of the clauses above, either alone or in combination, wherein the exercise machine comprises a first exercise machine, the operations further comprising: receiving sensor information, the sensor information including first sensor information associated with a first user participating in an exercise class using the first exercise machine, the first user participating in the exercise class by consuming the user interface.

O. The system of any of the clauses above, either alone or in combination, the operations further comprising: receiving second sensor information, the second sensor information associated with a second user participating in the exercise class, simultaneously with the first user, using a second exercise machine remote from the first exercise machine; and generating a leaderboard indicating a first performance metric of the first user and a second performance metric of the second user, the first performance metric being determined based at least in part on the first sensor information, and the second performance metric being determined based at least in part on the second sensor information.

P. The system of any of the clauses above, either alone or in combination, wherein the first sensor information comprises at least one of speed, heart rate, distance, hydration, respiration, cadence, and output of the first user.

Q. A method, comprising: receiving, with a processor, an indication of a number of segments included in an exercise class; generating a segmented timeline with the processor, the segmented timeline including a plurality of segments equal to the number of segments, at least one segment of the plurality of segments corresponding to a first workout activity of the exercise class; receiving, with the processor, sensor information associated with a first user participating in the first workout activity of the exercise class; generating a user interface with the processor, the user interface including the segmented timeline displayed together with video of the exercise class and at least a portion of the sensor information; and providing the user interface to a plurality of exercise machines, with the processor, and via a network.

R. The method of any of the clauses above, either alone or in combination, further comprising determining an average of the sensor information with the processor, the at least the portion of the sensor information comprising the average of the sensor information.

S. The method of any of the clauses above, either alone or in combination, wherein the average comprises one of: a first average of sensor information corresponding to the first user and a second user participating in the workout, and a second average of sensor information corresponding to the first user participating in the exercise class a plurality of times.

T. The method of any of the clauses above, either alone or in combination, wherein the segmented timeline includes a first indication of elapsed time, a second indication of a time remaining in the at least one segment, and visual indicia indicative of the first workout activity of the exercise class.

CONCLUSION

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the examples and applications illustrated and described, and without departing from the spirit and scope of the present invention, which is set forth in the following claims.

What is claimed is:

1. A method, comprising:
    receiving, with a processor, video input data associated with an exercise class;
    receiving, with the processor, a first indication of a first workout activity being performed at a first time and for a first duration in the video input data and a second indication of a second workout activity being performed at a second time and for a second duration in the video input data;
    generating a segmented timeline comprising a visual representation of the exercise class, the segmented timeline having an overall length corresponding to an overall duration of the exercise class, a first segment having a first segment length corresponding to the first duration, and a second segment having a second segment length corresponding to the second duration, wherein the segmented timeline includes first visual indicia representative of the first workout activity and second visual indicia representative of the second workout activity;
    generating, with the processor, a graphical user interface including the segmented timeline displayed together with at least part of the video input data; and
    causing the graphical user interface to be displayed on a display of an exercise machine.

2. The method of claim 1, wherein at least one of the first workout activity or the second workout activity comprising at least one of bicycling, running, walking, aerobics, stretching, or weightlifting.

3. The method of claim 1, wherein the graphical user interface further includes a leaderboard displayed together with the segmented timeline and the at least part of the video input data, the leaderboard indicating relative performances of a plurality of participants in the exercise class.

4. The method of claim 1, wherein the segmented timeline includes a first indication of elapsed time and a second indication of a time.

5. The method of claim 1, wherein the video input data comprises a video feed received from at least one recording device disposed within a performance studio.

6. The method of claim 1, further comprising:
    receiving sensor information associated with a user participating in the exercise class using the exercise machine.

7. The method of claim 6, further comprising:
    receiving, with the processor, second sensor information associated with a second user participating in the exercise class, simultaneously with the first user, using a second exercise machine;
    generating a leaderboard indicating a first performance metric of the first user and a second performance metric of the second user, the first performance metric being determined based at least in part on the first sensor information, and the second performance metric being determined based at least in part on the second sensor information; and
    causing the leaderboard to be displayed on at least one of the display of the exercise machine or a second display of the second exercise machine.

8. The method of claim 6, wherein the sensor information comprises at least one of speed, heart rate, distance, hydration, respiration, cadence, or output of the first user, and wherein the sensor information is received by the processor via a network.

9. A system, comprising:
    a processor;
    an exercise machine in communication with the processor via a network, the exercise machine including a display; and
    memory in communication with the processor and storing instructions which, when executed by the processor, cause the processor to perform operations comprising:
        receiving video input data associated with an exercise class,
        receiving a first indication of a first workout activity being performed at a first time and for a first duration in the video input data and a second indication of a second workout activity being performed at a second time and for a second duration in the video input data,
        generating a user interface including a segmented timeline displayed together with at least part of the video input data, the segmented timeline having an overall size representative of a total duration of the exercise class, a first segment having a first size representative of the first duration, and a second segment having a second size representative of the second duration, wherein the segmented timeline includes first visual indicia indicative of the first workout activity and second visual indicia indicative of the second workout activity; and
        causing the user interface to be displayed on a display associated with the exercise machine via the network.

10. The system of claim 9, wherein at least one of the first workout activity or the second workout activity comprising at least one of bicycling, running, walking, aerobics, stretching, or weightlifting.

11. The system of claim 9, wherein the user interface further includes a leaderboard displayed together with the segmented timeline and the at least part of the video input data, the leaderboard indicating relative performances of a plurality of participants in the exercise class.

12. The system of claim 9, wherein the segmented timeline includes a first indication of elapsed time and a second indication of a time.

13. The system of claim 9, wherein the video input data comprises a video feed received from at least one recording device disposed within a performance studio.

14. The system of claim 9, the operations further comprising: receiving sensor information associated with a user participating in the exercise class using the exercise machine.

15. The system of claim 14, the operations further comprising:
    receiving second sensor information associated with a second user participating in the exercise class, simultaneously with the first user, using a second exercise machine;
    generating a leaderboard indicating a first performance metric of the first user and a second performance metric of the second user, the first performance metric being determined based at least in part on the first sensor information, and the second performance metric being determined based at least in part on the second sensor information; and causing the leaderboard to be displayed on at least one of the display of the exercise machine or a second display of the second exercise machine.

16. The system of claim 14, wherein the first sensor information comprises at least one of speed, heart rate, distance, hydration, respiration, cadence, or output of the user.

17. A method, comprising:
receiving, with a processor, an indication of a first workout activity performed at a first time and for a first duration during an exercise class and a second indication of a second workout performed at a second time and for a second duration during the exercise class;
generating a segmented timeline with the processor, the segmented timeline including a first segment including a first visual representation corresponding to the first workout and a second visual representation corresponding to the second workout, the first visual representation having a first size corresponding to the first duration and the second visual representation having a second size corresponding to the second duration, wherein the segmented timeline includes first visual indicia indicative of the first workout activity and second visual indicia indicative of the second workout activity;
generating a user interface with the processor, the user interface including the segmented timeline displayed together with video of the exercise class;
causing the user interface to be displayed on a display of an exercise machine;
receiving, with the processor, sensor information associated with a user participating in the exercise class using the exercise machine; and updating the user interface to include a visual indication of the sensor information.

18. The method of claim 17, further comprising determining an average of the sensor information with the processor, the visual indication representing the average of the sensor information.

19. The method of claim 18, wherein the average comprises one of:
a first average of sensor information corresponding to the user and second sensor information corresponding to a second user participating in the exercise class, or
a second average of sensor information corresponding to the user participating in the exercise class a plurality of times.

20. The method of claim 17, wherein the segmented timeline includes a first indication of elapsed time and a second indication of a time.

* * * * *